March 4, 1952 — C. D. FAIRCHILD ET AL — 2,587,715
TARGET AIRCRAFT HIT INDICATING SYSTEM
Filed Aug. 18, 1947 — 2 SHEETS—SHEET 1
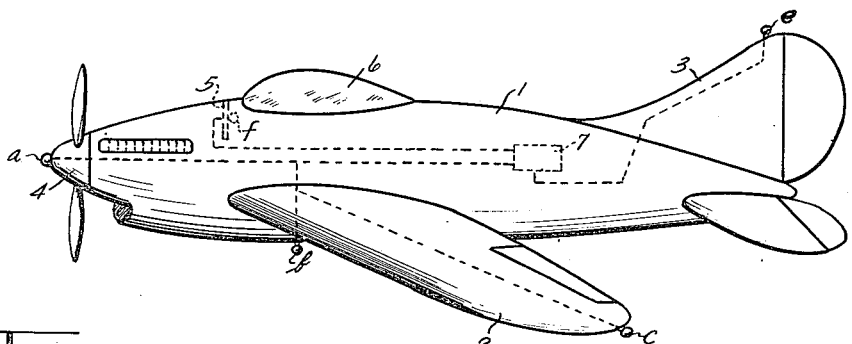
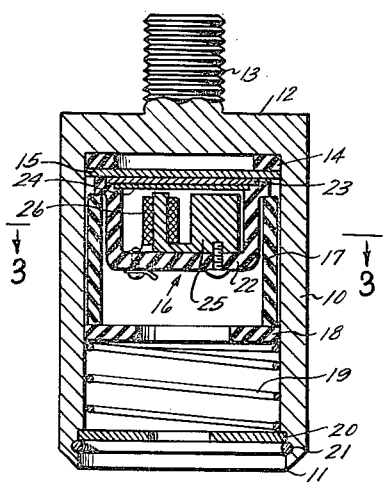
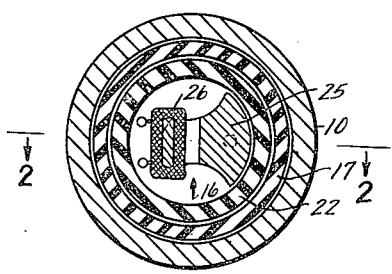
INVENTORS.
CAMERON D. FAIRCHILD
PAUL M. GROSS
MARCUS E. HOBBS
BY Charles L. Burgoyne
AGENT
Wade Koontz
ATTORNEY

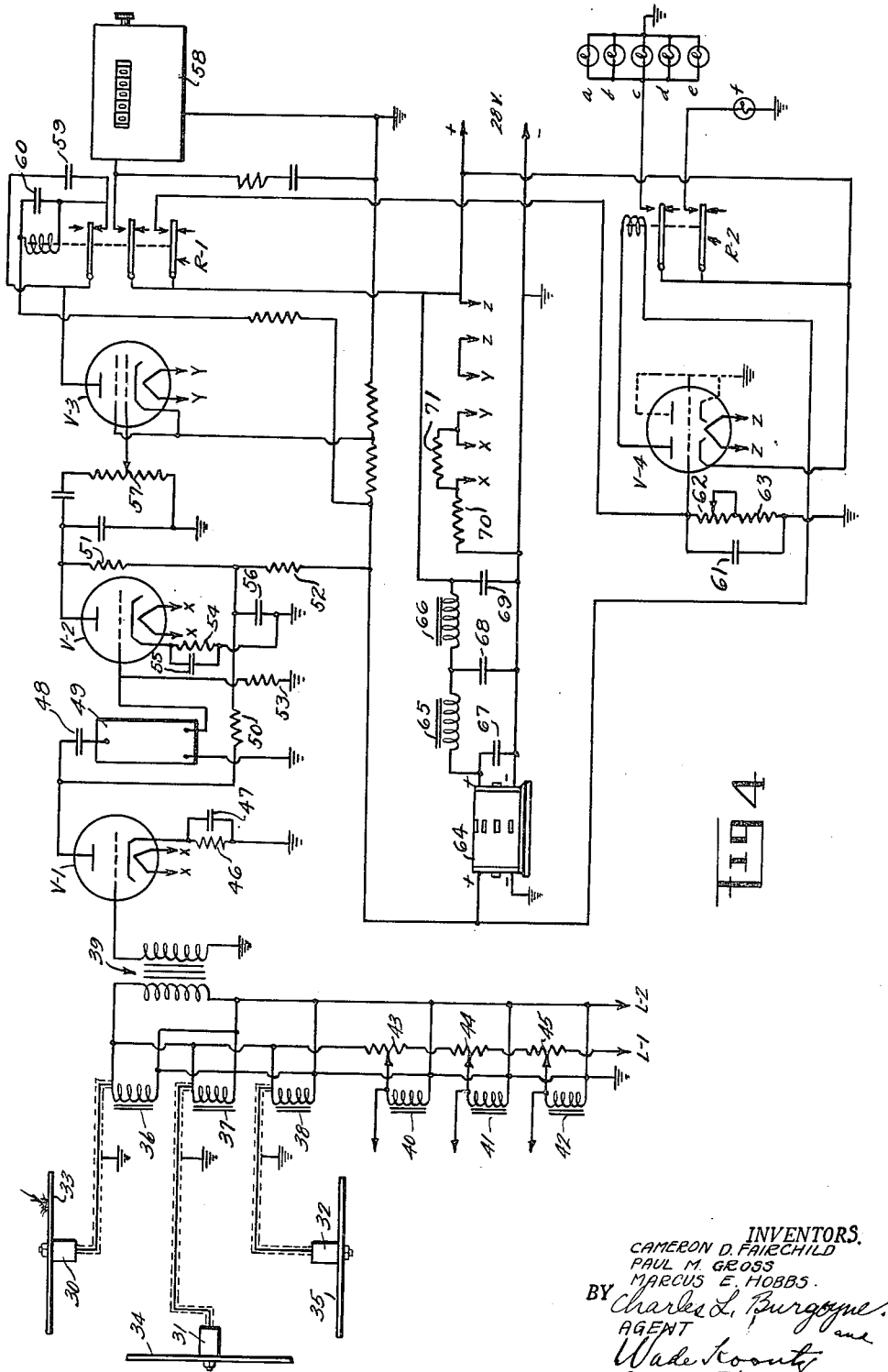

Patented Mar. 4, 1952

2,587,715

UNITED STATES PATENT OFFICE 2,587,715

TARGET AIRCRAFT HIT INDICATING SYSTEM

Cameron D. Fairchild, Houston, Tex., and Paul M. Gross and Marcus E. Hobbs, Durham, N. C.

Application August 18, 1947, Serial No. 769,124

4 Claims. (Cl. 273—102.2)

The invention described herein may be manufactured and used by and for the Government for governmental purposes without the payment to us of any royalty thereon.

This invention relates to a system and apparatus for counting and indicating hits on a target airplane and is particularly adapted for use in gunnery training.

The primary object of the invention is to provide in a target aircraft an arrangement of impact pickup means and impact counting and indicating apparatus, with appropriate connections between the pickup means and the counting and indicating apparatus.

It is a principal object of the invention to provide a system for counting and indicating hits on target airplanes and to generally improve the art of aircraft gunnery training.

In aircraft gunnery training it is advantageous to be able to practice firing on full-size aircraft which are being flown under conditions simulating actual air combat. To avoid serious damage to the aircraft and flying personnel the ammunition used in such gunnery training is preferably of a non-metallic type which disintegrates under impact, especially on striking thin armor plate as used on modern fighter aircraft. While these frangible bullets might be capable of making a mark on the aircraft or even puncturing a hole in the skin thereof, this would provide no indication at the instant of impact that the aircraft had been struck. Thus in accordance with the present invention it is proposed to provide means to actuate a signal when the aircraft is hit, or to actuate a plurality of signals one of which may be located in the cockpit of the target aircraft and the others located on the outside thereof so as to be readily observed by the attacking aircraft.

A related object of the invention is to provide an electrical impact indicating and counting apparatus including means to amplify the impact signal, means to filter out extraneous signals such as might be caused by engine vibration, and means to produce an electrical surge by the action of the impact signal for actuation of a signal means.

A further object of the invention is to provide an improved electrical pickup device particularly adapted for producing a signal under the influence of impact stress.

With the above and other objects in view reference is made to the accompanying drawings, wherein;

Fig. 1 is a perspective view of a target airplane and showing diagrammatically the connections between the impact indicating lamps and the impact signal amplifying and counting apparatus.

Fig. 2 is a longitudinal cross-sectional view of the electrical signal pickup device taken on line 2—2 of Fig. 3.

Fig. 3 is a transverse cross-sectional view of the electrical signal pickup device taken on line 3—3 of Fig. 2.

Fig. 4 is a complete wiring diagram of the impact signal amplifying, counting and indicating apparatus.

Referring now to Fig. 1 it will be seen that a single-engine low-wing monoplane is shown, having a fuselage 1, left wing 2, vertical stabilizer or fin 3, nose spinner 4 and instrument panel 5. The target airplane shown is a pursuit type of aircraft in which a cockpit for the pilot is covered by a bubble canopy 6, and in which the pilot's cockpit is inclosed by sheets of armor plate, except at the top where the canopy is located. In target practice when a bullet hits the armor plate it is desired to light signal lamps $a$, $b$, $c$, $d$ and $e$ located on the outside of the target plane as shown in Fig. 1. Since the lamp $d$ is on the right wing tip the same is not seen in Fig. 1, but is included in the wiring diagram (Fig. 4). Also at the same time the lamps $a$ to $e$ are lit, a lamp $f$ on the instrument panel 5 also lights up to inform the target plane pilot that his aircraft has been hit. Thus the combat practice provides training for the pilot of the target plane in evasive action, at the same time the personnel of the attacking aircraft obtain realistic gunnery practice. As may be seen in Fig. 1 conducting lines are shown connecting the lamps $a$ to $f$ to the impact amplifying and registering apparatus carried in a case 7 located rearwardly of the pilot's cockpit.

The armor plate inclosing the pilot's cockpit may include a rear sheet back of the pilot, a bottom or floor sheet and two side sheets. A forward sheet or shell may also be provided particularly in aircraft having the engine located rearwardly of the pilot's cockpit. When the engine is located forwardly of the cockpit the main fire wall serves as an armor plate. Regardless of the arrangement of the armor plate each main portion or sheet thereof is provided with one or more pickup devices as shown in detail in Figs. 2 and 3. Other pickups may be secured to other portions of the aircraft, such as the engine cowling, wing structure, tail surfaces, air scoop and fuselage surfaces.

The impact signal pickup device is shown in detail in Figs. 2 and 3. As illustrated in the drawings this device comprises a metallic shell or cartridge 10 having an open end 11 to receive the impact sensitive mechanism and having a closed end 12. The closed end carries a threaded stud or projection 13 for use in attaching the pickup device to a sheet member or other structural element of the aircraft. The pickup device is adapted to be located within the aircraft and to be retained by the stud 13 extending outwardly through an aperture in the aircraft skin or in a section of the aircraft armor plate. The outer end of the stud receives a securing nut to hold the pickup device in relative fixed position without rattling or becoming loose while the aircraft is in flight.

Starting from the closed end of the shell 10, the parts of the pickup device enclosed within the shell will be described consecutively. Seated directly against the enclosed end is a rubber washer 14 forming a cushion-like seat for an aluminum disc 15 and in abutment with the disc is a telephone receiver or magnetic pickup 16 having a peripheral flange forming an abutment means for one end of an insulating sleeve 17 while the other end of the sleeve forms an abutment means for an insulating washer 18, and the latter serves as a bearing plate for the helical spring 19. Adjacent the open end 11 there is a spring retainer plate or washer 20 held in place against a suitable shoulder by means of a split ring retainer 21 which may be snapped in place on the inside of the shell and retained within an annular groove. The retainer 21 being formed of spring wire, its natural resilience holds it in an expanded condition within the groove provided therefor.

The telephone receiver 16 as here illustrated comprises a shell or cup 22 of non-magnetic material adapted to have its open end closed by means of an aluminum disc 23, and an iron diaphragm 24 is situated between the aluminum disc 23 and the permanent magnet 25. As may be seen the permanent magnet is of generally U-shaped cross section which provides a leg portion receiving a securing screw and a wire wound leg portion which carries a coil of wire 26. The terminals of the coil 26 are attached to binding posts which extend through the closed end of the shell 22. One of these binding posts receives a conductor extending out through the openings in washers 18 and 20 while a conductor from the other binding post is brought out only far enough to make a ground connection with the metallic shell 10 or with the shielding around the conductor mentioned. In operation the magnetic pickup provides means to produce a weak signal upon movement of the iron diaphragm 24 under influence of impact at or in the vicinity of the pickup. The magnetic path through the U-shaped permanent magnet 25 is completed by way of diaphragm 24 but there is a slight spacing between the diaphragm and the legs of the magnet. Variations in this spacing causes increase or decrease of the flux density in the magnet, this in turn causing an induced current to flow in the coil 26 having a large number of turns of fine copper wire. The magnetic type of pickup illustrated is shown by way of example and it is understood that other pickup devices may be substituted if desired. The pickup disclosed herein has been found to be sufficiently sensitive for the purpose and is also structurally adequate to give trouble-free operation. To keep out dust, oil and moisture the pickup devices may be enclosed by rubber covers having a sliding fit over the outer cylindrical surface of the pickup devices. An aperture in each cover permits the single conductor from the magnetic pickup unit 16 to pass therethrough. Each conductor is shielded by woven metallic tubing and the shielding is grounded, thus preventing ignition interference as far as possible.

Turning now to Fig. 4 a plurality of signal pickup devices are indicated at 30, 31 and 32 and are shown as attached to armor plate sections 33, 34 and 35 located at the left, rear and right sides of the pilot's cockpit in the target airplane (Fig. 1). Signals from the pickups 30, 31 and 32 are conducted to the load inductors 36, 37 and 38 by means of shielded conductors and by way of a common ground connection. Each inductor may accommodate at least a dozen pickup units, each of the latter having a high resistance in the neighborhood of 1000 ohms. The inductors are each connected in parallel with the primary of input transformer 39 of the resistance-coupled amplifier comprising vacuum tubes V-1 and V-2. Additional load inductors may be connected to the transformer 39 and in Fig. 4 there are three more illustrated, which are designated by numerals 40, 41 and 42. Each of these additional inductors are connected to the transformer 39 through potentiometers 43, 44 and 45 respectively, and the pickups connected therewith are particularly intended for location at points close to the aircraft engine, where vibration is at a maximum. For instance with the engine located in the nose section of the aircraft, the pickup devices located on engine fire wall, engine cowling and air scoop should be connected to the load inductors 40 to 42, which are connected to the input transformer 39 by way of the potentiometers 43 to 45. The potentiometers serve as means to limit or regulate the signal strength, and at the same time permit the relatively high-strength impact signal to reach the counting and indicating apparatus. Depending on the amount of engine vibration the potentiometers 43 to 45 may be adjusted to cut down to a minimum the signals caused by the engine vibrations. For the average installation where the aircraft is powered by a reciprocating piston type of engine the potentiometers 43 to 45 may have a rated resistance of 2000 ohms each.

The signal output from the secondary of transformer 39 is passed through the two-stage resistance coupled amplifier comprising vacuum tubes V-1 and V-2. The latter two tubes may be of the same type, and as an example the type of tube may be 6SL7. The cathode of tube V-1 is connected to ground through a resistor 46 having a value of 2500 ohms, the latter being connected to a bypass condenser 47 of one-tenth microfarad value. The plate of tube V-1 is connected through a condenser 48 to a high-pass filter 49 having a limit rating of 2500 cycles per second. Thus any signals having a frequency appreciably less than 2500 cycles per second can not pass through the filter and do not reach amplifying tube V-2. It has been found that signals resulting from a bullet impact have a relatively high frequency, usually above 2500 cycles per second. The filter 49 is thus designed to pass a minimum of extraneous signals such as arise from engine and propeller vibration, but will permit the high frequency signals caused by bullet impact to pass on to the second stage of amplification embodying tube V-2. The coupling resistor 50 between the plate circuits may have a resistance of 12 megohms, while the resistors 51 and 52 are preferably of 0.4 megohm and 10 megohms respectively. The grid biasing resistor 53 should have a high value, of about 12 megohms. The resistor 54 has been selected to have a rating of about twice that of resistor 46, with the bypass condenser 55 being the same in value as bypass condenser 47. A small bypass condenser 56 is connected from the plate circuits of tubes V-1 and V-2 to ground.

The amplified signal from the resistance coupled amplifier is used to trigger a thyratron circuit including the gas-filled tube V-3, which may be of the type designated 2050. The signal as applied to the control grid of tube V-3 is taken off a potentiometer 57 rated at one megohm. The gas-filled thyratron tube V-3 is normally non-conducting, but by means of a signal received from the amplifier the control grid of the tube is given a positive bias and thus an electron flow is started from cathode to plate. This sets up a fairly high current flow through the tube and through the holding coil of relay R-1. The relay contactors thus assume an upward position to: (1) break the plate circuit of tube V-3, (2) close a circuit to counter 58, and (3) close another circuit which impresses an electrical potential on the grid circuit of vacuum tube V-4, the latter preferably being a 6SN7 type or some equivalent tube type. By interrupting the plate circuit of tube V-3 the current flow therethrough is stopped to allow the grid circuit to regain control of the trigger action of this gas-filled tube. The condensers 59 and 60 in the relay circuit are each rated at one-half microfarad. Closing the 28 volt circuit to the counter 58 results in moving the counter mechanism to a target hit, and it is understood that the counter register is turned back to a zero reading before the target plane is flown in a simulated combat operation. In its upward position the lowermost contactor of relay R-1 closes a 28 volt circuit to the control grid of vacuum tube V-4, and to the condenser 61.

The vacuum tube V-4 has its plate circuit connected to include the holding coil of relay R-2, which relay controls the lighting of the indicating lamps a to f previously mentioned. It is desired to maintain the lamps lit up long enough to allow a person at some distance to note the illumination. A mere instantaneous flicker as would be obtained by using additional contactors in relay R-1 would be hardly discernible, especially to a person in a fast moving pursuit aircraft. Due to the negligible resistance of the charging circuit of condenser 61, the voltage across this condenser builds up to substantially that of the 28 volt source during the brief time that the relay R-1 is in the upward or energized position. It is also noted that there is a negative bias on the triode V-4 produced by the 28 volt source. With the relay R-1 in the downward position and with little or no charge on condenser 61 the 28 volt source keeps the tube V-4 biased to cutoff. However the voltage across the condenser 61 after relay R-1 becomes energized opposes the fixed bias on the tube, causing the tube to become conductive and causing the relay R-2 to close. When the relay R-1 again becomes deenergized the condenser 61 is disconnected from the potential source and proceeds to discharge through the resistors 62 and 63. The resistor 62 being adjustable the total resistance may be adjusted between limits. The discharge rate of condenser 61 is determined by the value of the combined resistance 62 and 63, and as the discharge proceeds the potential of the grid of tube V-4 is lowered. The length of time that relay R-2 will remain closed will be determined by the time required for the decreasing grid potential to reduce the plate current of the tube V-4 below the threshold value of the current for relay R-2. This length of time may of course be controlled by adjusting the resistor 62. It is also clear that if the target plane is being hit by a rapid succession of projectiles, the relay R-2 may stay closed for a period of time even though each hit is being recorded by the counter 58. Thus if the lamps a to f remain lighted for brief periods of time, say 5 to 20 seconds or longer, then it would be clear that the target plane was being hit so rapidly and continuously that the delay circuit of tube V-4 did not have sufficient time between hits to allow the tube to cut off, and the relay R-2 to open.

As shown in Fig. 4 the vacuum tube V-4 has duplicate cathode, grid and plate elements but one set are shown as grounded and not in use. It is possible however to use these elements in actuating another relay, just as the relay R-2 is actuated. This additional relay may operate additional lamps on the aircraft, it may operate various type of audible or visible signals, or may even actuate a keying device on a small radio transmitter which would be adapted to give a signal at distant radio receiving stations.

The plate potentials of the various vacuum tubes V-1, V-2, V-3 and V-4 are supplied from a dynamotor 64 having the low voltage side connected through chokes 65 and 66 of 100 microhenries each forming part of a filter circuit which avoids interference effects from the dynamotor in the aircraft radio equipment. The condensers 67, 68 and 69 in this filter circuit may be of 0.0008, 150 and 0.0008 microfarad values respectively. The dropping resistor 70 in the vacuum tube heater circuit is of 10 ohm value, while the shunt resistor 71 across heaters X—X is of 20 ohm value. In the circuit of Fig. 4 and in Fig. 1 a particular number and arrangement of signal lamps is shown but it is understood that this is merely a preferred and satisfactory arrangement. Other arrangements of signal lamps may be quite effective for the purposes of the invention.

The type of projectile or bullet as used in the present system of indicating and counting target hits should be such as provide frangibility, and thus avoid the destructiveness of regulation ammunition. It has been found that bullets made of a frangible plastic composition are most satisfactory, Bakelite being found the best type of plastic to use. The Bakelite bullet, as shown striking the armor plate 33 in Fig. 4, not only breaks but more or less pulverizes on impact. If desired the bullets may have a core of sand held together with adhesive and covered with a hard shell of Bakelite or other synthetic plastic material. On impact the hard brittle covering thus shatters and the core material instantly pulverizes. According to the present system of counting and indicating hits on target aircraft there should be a number of the magnetic pickup devices on each section of armor plate, or on each part of the aircraft which is considered vital to the continuous operation thereof. Also the pickup devices on any one part or element should be will distributed for best results. In Fig. 4 it is also noted that the leads L-1 and L-2 may be connected to additional pickup units for more complete reception of all aircraft hits. The actual form of pickup device disclosed herein by way of example, and illustrated in Figs. 2 and 3, need not be used in the system of counting and indicating hits on target aircraft. For instance the pickup device may be of piezo-electric type, including a stack of quartz crystals in a case and having end electrodes for collecting the charge developed by the crystals when mechanically stressed. The pickup might also be of a magnetic type where the magnetostrictive property of iron or steel is employed.

As may be seen from the above description the present system provides an interconnected electrical apparatus, including means to give an electrical impulse on impact of a projectile with a surface forming member or sheet. The electrical impulse is adapted to be amplified and discriminated from other signals which may be caused by vibration, and then used to operate an impact counting circuit. To give a visual indication of some persistence the amplified impulses also is used to operate, through a vacuum tube circuit whose cut off is delayed, a group of signal lamps carried on the target aircraft.

The embodiments of the invention herein shown and described are to be regarded as illustrative only and it is to be understood that the invention is susceptible to variations, modifications and changes within the scope of the appended claims.

We claim:

1. A system for counting and indicating hits on target aircraft comprising, means to produce an electrical impulse of high frequency upon impact of a projectile against a portion of the aircraft, means to amplify said electrical impulse, means included in said amplifying means to filter out low frequency electrical signals caused by vibration originating in the aircraft engine, means including a gas-filled tube for actuating a relay by the amplified electrical impulse, an impulse counting means adapted for actuation by said relay, a visual indicator on the target aircraft adapted for actuation by said relay, and means including a vacuum tube circuit having a delayed cutoff and connected between said relay and said visual indicator for providing a visual indication of some persistence upon projectile impact against said portion of the aircraft.

2. In a target aircraft having armor plate inclosing at least a portion of the pilot's cockpit, means carried on said armor plate to produce an electrical impulse of high frequency upon impact of a projectile against said armor plate, means including a signal lamp carried on the aircraft to produce a visual indication of projectile impact against said armor plate, a circuit connecting the means carried on said armor plate and the means including a signal lamp, and means included in said circuit to filter out extraneous low frequency electrical signals caused by vibration originating in the aircraft engine.

3. A system for counting and indicating hits on target aircraft comprising, means to produce an electrical impulse of high frequency upon impact of a projectile against a portion of the aircraft, means to amplify said electrical impulse, means included in said amplifying means to filter out low frequency electrical signals caused by vibration originating in the aircraft engine, means including a gas-filled tube for actuating a relay by the amplified electrical impulse, an impulse counting means adapted for actuation by said relay, means adapted for actuation by said relay for breaking the plate circuit of said gas-filled tube, a visual indicator on the target aircraft adapted for actuation by said relay, and means including a vacuum tube circuit having a delayed cutoff and connected between said relay and said visual indicator for providing a visual indication of more than momentary persistence upon projectile impact against said portion of the aircraft.

4. A system for indicating hits on target aircraft comprising, means to produce an electrical impulse upon impact of a projectile against a portion of the aircraft, means to amplify said electrical impulse, means including a gas-filled electron tube for actuating a relay by the amplified electrical impulse, means adapted for actuation by said relay for breaking the plate circuit of said gas-filled tube, an electronic circuit including a vacuum tube and a condenser in the grid circuit thereof adapted to be charged by actuation of said relay, a second relay adapted for actuation by said electronic circuit upon charging of said condenser, a visual indicator actuated by said second relay for providing a visual indication upon projectile impact against said portion of the aircraft, and resistance means for slowly discharging said condenser to provide a delayed cutoff action for said vacuum tube and maintain said second relay actuated and thus provide more than momentary persistence of said visual indication.

CAMERON D. FAIRCHILD.
PAUL M. GROSS.
MARCUS E. HOBBS.

REFERENCES CITED

The following references are of record in the file of this patent:

UNITED STATES PATENTS

| Number | Name | Date |
| --- | --- | --- |
| 232,417 | Savage | Sept. 21, 1880 |
| 2,275,675 | Draper et al. | Mar. 10, 1942 |
| 2,331,236 | Schaefer | Oct. 5, 1943 |
| 2,331,237 | Schaefer | Oct. 5, 1943 |
| 2,337,132 | Shaw | Dec. 21, 1943 |
| 2,340,714 | Traver et al. | Feb. 1, 1944 |
| 2,349,182 | Lesnick | May 16, 1944 |
| 2,427,901 | Clark | Sept. 23, 1947 |
| 2,473,922 | Tobias | June 21, 1949 |

FOREIGN PATENTS

| Number | Country | Date |
| --- | --- | --- |
| 465,537 | France | Feb. 9, 1914 |